United States Patent
Bu et al.

(10) Patent No.: US 8,400,933 B2
(45) Date of Patent: *Mar. 19, 2013

(54) EFFICIENT PROBABILISTIC COUNTING SCHEME FOR STREAM-EXPRESSION CARDINALITIES

(75) Inventors: Tian Bu, Edison, NJ (US); Jin Cao, Edison, NJ (US); Aiyou Chen, New Providence, NJ (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,380

(22) Filed: Apr. 28, 2008

(65) Prior Publication Data

US 2009/0268623 A1   Oct. 29, 2009

(51) Int. Cl.
*H04J 1/16* (2006.01)
(52) U.S. Cl. ......... 370/252; 370/253; 709/223; 709/224
(58) Field of Classification Search .......... 709/223–224; 370/250, 252, 253
See application file for complete search history.

(56) References Cited

U.S. PATENT DOCUMENTS

| | | | |
|---|---|---|---|
| 6,980,521 B1 | 12/2005 | Jarvis | |
| 7,206,861 B1 | 4/2007 | Callon | |
| 8,204,985 B2 * | 6/2012 | Cao et al. | 709/224 |
| 8,214,479 B2 * | 7/2012 | Luessem et al. | 709/223 |
| 2005/0220023 A1 * | 10/2005 | Kodialam et al. | 370/235 |
| 2007/0155396 A1 * | 7/2007 | Kim et al. | 455/453 |
| 2009/0271509 A1 | 10/2009 | Cao et al. | 709/224 |

OTHER PUBLICATIONS

Cai et al. Fast and Accurate Traffic Matrix Measurement Using Adaptive Cardinality Counting. Aug. 22-26, 2005. ACM. Proceedings of the 2005 ACM SIGCOMM workshop on Mining network data. pp. 205-206.*
M. Durand and P. Flajolet. Loglog Counting of Large Cardinialities. 2003. Springer-Verlag Berlin. pp. 605-617.*
Liang, Gang and Bin, Yu. "Maximum Pseudo Likelihood Estimation in Network Tomography," IEEE Transactions on Signal Processing, vol. 51, No. 8, pp. 2043-2053, Aug. 2003.
Zhao, Qi et al., "Data Streaming Algorithims for Accurate and Efficient Measuring of Traffic and Flow Matrices." Proceedings of the 2005 ACM SIGMETRICS International Conference on Measurement and Modeling of Computer Systems, Banff, Alberta Canada, Jun. 6-10, 2005. SIGMETRICS 2005, ACM, New York, NY 350-3.

* cited by examiner

*Primary Examiner* — Hassan Kizou
*Assistant Examiner* — Ashil Farahmand
(74) *Attorney, Agent, or Firm* — Mendelsohn, Drucker & Associates, P.C.

(57) ABSTRACT

In one embodiment, a method of monitoring a network. The method includes, at each node of a fixed set, constructing a corresponding vector of M components based on data packets received at the node during a time period, M being an integer greater than 1, the fixed set being formed of some nodes of the network; and, based on the constructed vectors, estimating how many of the received data packets have been received by all of the nodes of the set or estimating how many flows of the received data packets have data packets that have passed through all of the nodes of the set. The constructing includes updating a component of the vector of one of the nodes in response to the one of the nodes receiving a data packet. The updating includes selecting the component for updating by hashing a property of the data packet received by the one of the nodes.

30 Claims, 4 Drawing Sheets

At each node of a fixed set that is formed of some nodes of the network, construct a corresponding vector of M components based on data packets received at the node during a time period, where M is an integer greater than 1
610

Estimate either (i) how many of the received data packets have been received by all of the nodes of the set, or (ii) how many flows of the received data packets have data packets that have passed through all of the nodes of the set
620

EFFICIENT PROBABILISTIC COUNTING SCHEME FOR STREAM-EXPRESSION CARDINALITIES

CROSS-REFERENCE TO RELATED APPLICATIONS

This application is related to U.S. application Ser. No. 12/110,431, filed on the same date as this application, the teachings of which are incorporated herein by reference.

BACKGROUND OF THE INVENTION

1. Field of the Invention

The present invention relates to traffic analysis in a network.

2. Description of the Related Art

Massive and distributed data streams are increasingly prevalent in many modern applications. In a backbone Internet-Protocol (IP) network composed of hundreds or even thousands of nodes, packets arrive at and depart from the nodes at very high speeds. In a web content-delivery system composed of many servers (such as Akamai), user requests for accessing websites are distributed among the many servers based on the location of the user and current server loads. Other application domains that give rise to these massive and distributed streams include financial applications and sensor networks.

Due to their massive and distributed nature, answering queries about these data streams poses a unique challenge. Often, exact-query answering is infeasible due to memory requirements and communications overhead. In this scenario, approximate-query answering, which can provide probabilistic guarantees, becomes the only viable option. One of the most fundamental query classes of interest is the estimation of the number of flows in such streams.

As a first example, in the context of IP-network management, the number of distinct flows in a network sharing the same characteristics is of high interest to network operators, where a packet flow is defined as, e.g., a sequence of packets that have the same 5-tuple (a logical construct containing five parameters used to identify the connection and allowing network packets of data to be communicated between a server process and a client process in a bi-directional fashion), the same IP addresses/ports of the two communicating peers, and the same protocol. Moreover, the flow ID of a packet can be derived from the 5-tuple. The number of distinct flows between a node pair x and y, which is a type of traffic matrix element, can be formulated as the number of flows of $$Tx_x \cap Tx_y,$$

where $Tx_x$ and $Tx_y$ are the numbers of streams of packet-flow IDs seen at nodes x and y, respectively. Such traffic matrix elements can be used by network operators for network provisioning and optimization.

A second example is the total number of distinct flows to the same destination node i, i.e., $U_i \mathcal{T}_i$, where $\mathcal{T}_i$ are the streams of packet-flow IDs to node i. A significant increase in $U_i \mathcal{T}_i$ may indicate an underlying network anomaly, such as a Denial of Service (DoS) attack.

The term "set expression" refers to an expression that defines a set of data elements and is made up of set identifiers (i.e., names of sets) and set operations (such as complements, unions, intersections, and differences) performed on those sets. The term "stream expression" refers to a set expression defined over multiple streams (such as streams of data passing through different nodes of a network), where each stream is considered as a set of elements. Since, in a given stream expression, elements may appear more than once, the term "stream-expression cardinality" refers to the number of distinct elements in a stream expression. For example, in the Venn diagram of FIG. 3, where $T_1$ and $T_2$ represent two different stream expressions, the cardinality of $T_1$ is 1 (i.e., $T_1$ contains 1 distinct element), and the cardinality of $T_2$ is 2 (i.e., $T_2$ contains 2 distinct elements). The cardinality of the stream-intersection set $T_1 \cap T_2$ is 0, since there are no elements common to both $T_1$ and $T_2$, and the cardinality of the stream-union set $T_1 \cup T_2$ is 3.

SUMMARY OF THE INVENTION

In one embodiment, the present invention provides a method of monitoring a network. The method includes, at each node of a fixed set, constructing a corresponding vector of M components based on data packets received at the node during a time period, M being an integer greater than 1, the fixed set being formed of some nodes of the network; and, based on the constructed vectors, estimating how many of the received data packets have been received by all of the nodes of the set or estimating how many flows of the received data packets have data packets that have passed through all of the nodes of the set. The constructing includes updating a component of the vector of one of the nodes in response to the one of the nodes receiving a data packet. The updating includes selecting the component for updating by hashing a property of the data packet received by the one of the nodes.

DETAILED DESCRIPTION

Estimation methods for stream-expression cardinalities, consistent with embodiments of the present invention, will now be discussed in further detail in the following sequence. First, a method for monitoring flows or packets among multiple network nodes by using a Proportional-Union Estimation (PUE) estimator consistent with one embodiment of the invention will be described. Second, some basic statistical concepts and a continuous variant of Flajolet-Martin (FM) vectors on which a PUE method is based will be discussed. Third, a PUE estimator will be developed from the continuous FM vectors, and its performance will be characterized analytically. Fourth, the statistical efficiency of a PUE estimator will be analyzed by comparison with the MLE for expressions over two streams.

Figure 1:
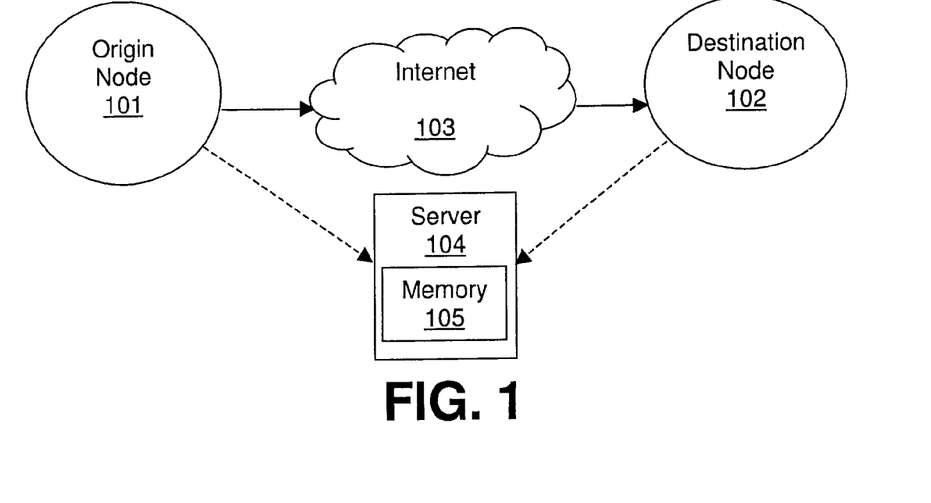
FIG. 1 is an exemplary block diagram for a portion of a network implementing a method consistent with one embodiment of the present invention.

An embodiment of a PUE method is a traffic-matrix estimation problem in a high-speed network, where the objective is to accurately estimate total traffic volume (in flows or packets) between origin and destination nodes in the network, using flows or packet streams observed at individual nodes. This embodiment may be used in the system of FIG. 1. In that system, data streams travel from an origin node 101 to a destination node 102 via the Internet 103. The streams include a first stream $T_1$ of flows or packets passing through origin node 101 and a second stream $T_2$ of flows or packets passing through destination node 102. Each of nodes 101 and 102 generates and provides a vector of M components, where M>1, to server 104, which applies one or more set operations to the vectors for the two data streams $T_1$, $T_2$ to generate a PUE cardinality estimate, i.e., an estimate of the number of elements in these data streams. Server 104 includes a memory 105 (e.g., a hard disk or RAM device) that contains machine-readable instructions for generating the PUE cardinality estimate. This PUE estimate characterizes the amount of traffic between origin node 101 and destination node 102 and can be used by server 104 for various traffic-monitoring or routing purposes. For example, server 104 might send messages to one or more nodes in the network (not shown) to admit new flows or packets into the network at origin node 101 or to deny entrance to such new flows or packets, depending on the amount of traffic indicated by the PUE cardinality estimate.

Figure 2:
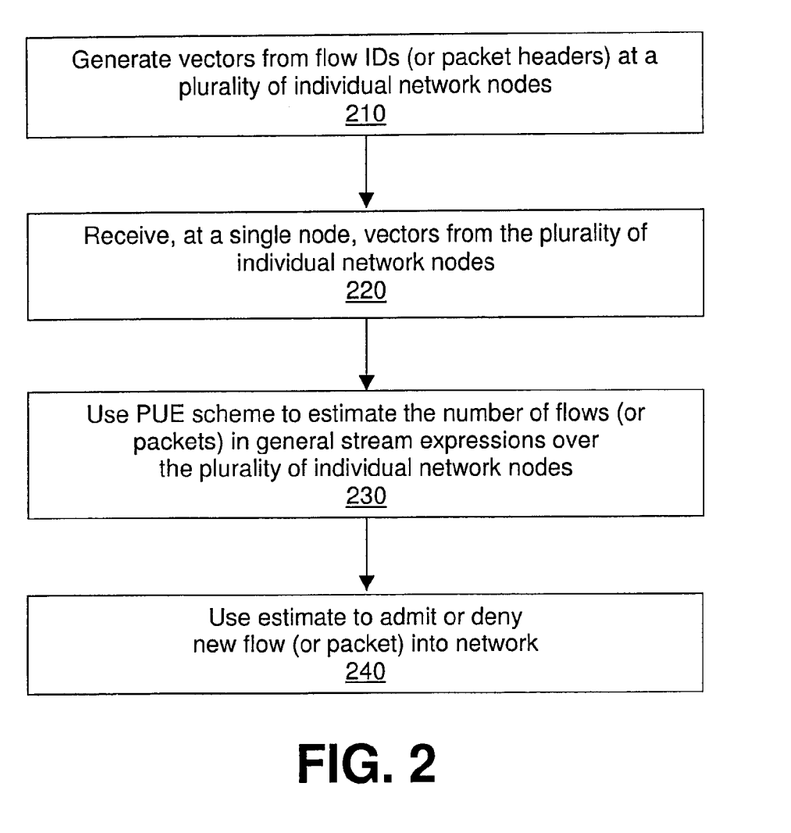
FIG. 2 is a flowchart of an exemplary method for monitoring flows or packets among multiple network nodes by using a Proportional-Union Estimation (PUE) estimator.
Figure 5:
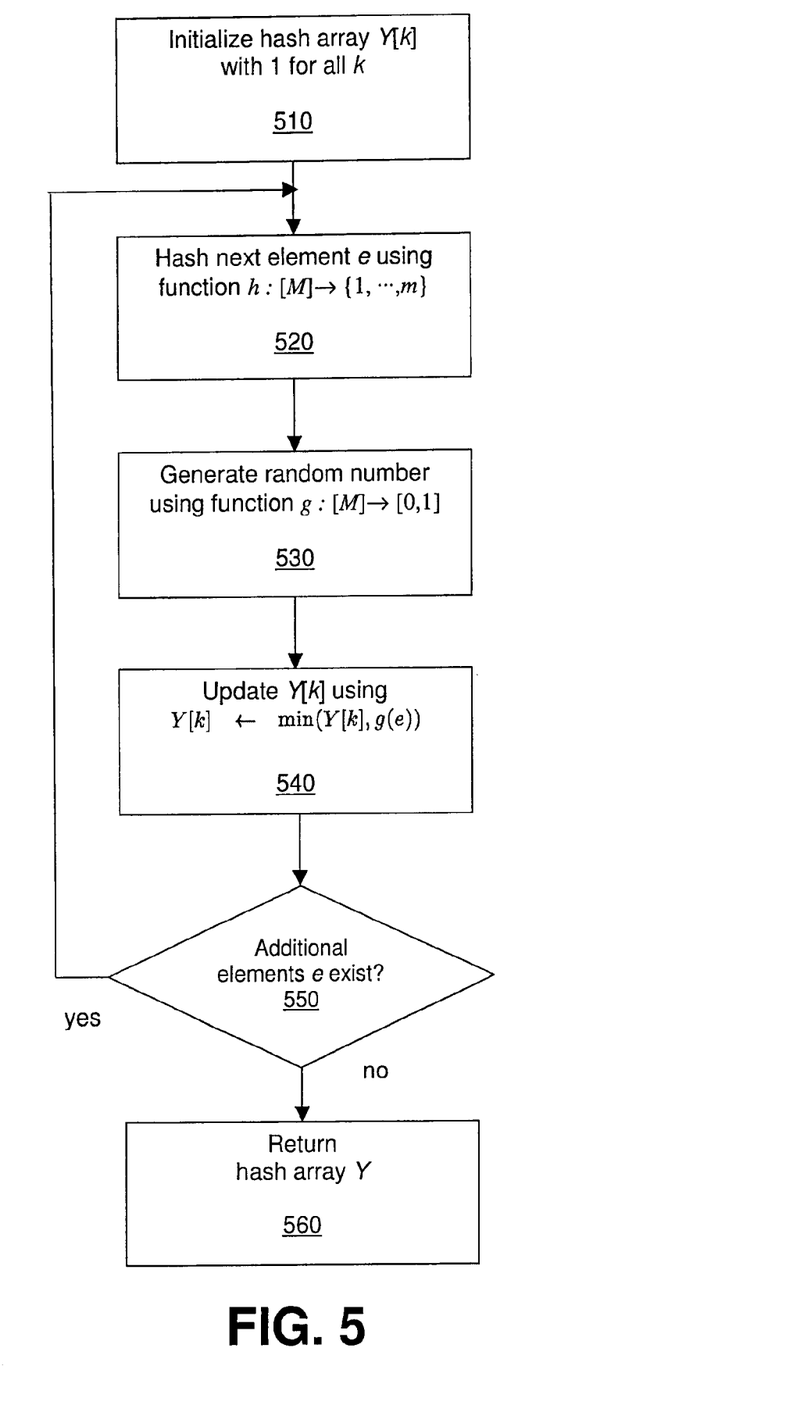
FIG. 5 is a flowchart illustrating a method for continuous FM-vector generation consistent with one embodiment of the present invention.

FIG. 2 shows an embodiment of a method for monitoring flows among network nodes with a PUE estimator. This method can also be used to monitor individual packets, each of which would simply be treated as a single-packet flow. First, at step 210, continuous FM vectors from flow IDs (or packet headers, in the case of single-packet flows) are generated at a plurality of individual nodes in the network (e.g., as shown in the flowchart of FIG. 5, which will be discussed in further detail below). Step 210 can be carried out, e.g., according to Algorithm 1, below. Next, at step 220, the vectors from the plurality of individual nodes in the network are all received at a single node (e.g., server 104 of FIG. 1). This receiving step may be the result of one or more queries from the single node, or alternatively, the vectors may automatically be provided by the individual nodes. At step 230, a PUE scheme, as will be described in further detail below, is used to estimate the number of flows (or packets, in the case of single-packet flows) in stream expressions over the plurality of individual nodes in the network, i.e., a PUE cardinality estimate is generated by applying one or more set operations to the vectors corresponding to the stream expressions. This generates an estimate of the number of either (i) the number of received data packets that have been received by all of the nodes of the set, or (ii) the number of flows within received data packets that have passed through all of the nodes of the set. Step 230 can be carried out, e.g., by methods based on the formulae of Equation (6), below. Lastly, at step 240, based on the amount of traffic indicated by the PUE cardinality estimate of the number of flows or packets, a determination is made whether to admit one or more new flows or packets into the network.

Some terminology used herein will now be introduced. The expression S is used herein to denote a stream expression of interest being studied, and N is the cardinality of the union of all streams. The variable $\delta$ represents a specified desirable value of relative standard error, which is a measure of an estimate's reliability obtained by dividing the standard error of the estimate by the estimate itself.

In the context of a stream of network flows, a stream expression passes through an arbitrary combination of some network nodes but not others. In general, distributed streams under consideration will be denoted by $\mathcal{T}_j$, $1 \leq j \leq J$, where J is the number of nodes in the network. The operators $\cup$, $\cap$, and $\setminus$ represent set union, set intersection, and set difference, respectively. The operator $|\cdot|$ is used to denote the cardinality of a set. For a stream expression that involves an arbitrary combination of unions, intersections, or differences of $\mathcal{T}_j$, $1 \leq j \leq J$, e.g., $$(T_{x_1} \cup T_{x_2}) \cap (T_{x_3} \setminus T_{x_4}),$$

estimating the cardinality of the set is done to provide probabilistic guarantees of estimation accuracy, which permits minimizing computational overhead and memory usage.

The following additional notations will be used herein. The expression $P(\cdot)$ represents a probability function. The expressions $E(\cdot)$ and $\text{var}(\cdot)$ represent the expectation and variance of a random variable, respectively. The expressions $\text{corr}(\cdot,\cdot)$ and $\text{cov}(\cdot,\cdot)$ represent correlation and covariance, respectively, between two random variables, and the expression $$\xrightarrow{d}$$

represents a convergence in distribution. The expression $\doteq$ means a definition, and the expression $a \approx b$ is equivalent to $a/b \approx 1$, where the operator represents an approximation of equality. The expression $\text{Exp}(r)$ (also written as $e^r$) is an exponential distribution with rate parameter r, and $\text{Normal}(\mu, \sigma^2)$ represents a Gaussian distribution with mean $\mu$ and variance $\sigma$. Finally, for a stream expression S over J streams, the variable N represents the cardinality of the total stream union, and $p_s = |S|/N$ represents the proportion of S in N, which proportion is also referred to herein as simply p.

A brief introduction of some statistical concepts that are used herein, including the notion of statistical efficiency, will now be provided. The expression $f_\theta(x)$ is a probability-density function for a continuous random variable x (or a probability-mass function for a discrete random variable x), parameterized by $\theta$. Supposing a random sample of size n is drawn from $f_\theta(\cdot)$, i.e., $x_1, x_2, \ldots, x_n$, the probability density associated with the observed data is $$f_\theta(x_1, \ldots, x_n) = \prod_{i=1}^{n} f_\theta(x_i).$$

As a function of $\theta$ with $x_1, x_2, \ldots, x_n$ observed, this is, in fact, the likelihood function $L(\theta)$ of $\theta$, i.e., $$L(\theta) = \prod_{i=1}^{n} f_\theta(x_i).$$

The expression $I(\theta)$ is defined by $$I(\theta) = \left(\frac{1}{n}\right) E\left(\frac{\partial}{\partial \theta} \log L(\theta)\right)^2 \qquad (1)$$

and $\hat{\theta}$ is an unbiased estimator of $\theta$ based on the given sample $x_1, x_2, \ldots, x_n$. The variance of $\hat{\theta}$ is then bounded by the reciprocal of the Fisher information $I(\theta)$, i.e., $$\mathrm{var}(\hat{\theta}) \geq \frac{1}{I(\theta)}.$$

The foregoing inequality is the well-known Cramer-Rao inequality, also known as the Cramer-Rao lower bound (CRB), as described in Bickel et al., *Mathematical Statistics: Basic Ideas and Selected Topics, Vol 1,* (2nd Edition), Prentice Hall, 2000, which is incorporated herein by reference in its entirety. The efficiency of $\hat{\theta}$ is defined using the Cramer-Rao lower bound by $$\mathit{eff}(\hat{\theta}) = \frac{1/I(\theta)}{\mathrm{var}(\hat{\theta})}. \qquad (2)$$

From the Cramer-Rao inequality, $\mathit{eff}(\hat{\theta}) \leq 1$. A desirable statistical inference method seeks an efficient estimator $\hat{\theta}$ that has a large value $\mathit{eff}(\hat{\theta})$ of efficiency. One such method is the popular Maximum-Likelihood Estimation (MLE) method. The MLE of $\theta$, $\hat{\theta}_{MLE}$, is defined by finding the value of $\theta$ that maximizes $L(\theta)$, i.e., $\hat{\theta}_{MLE} = \mathrm{argmax}_\theta L(\theta)$, where the function argmax represents the argument of the maximum. As the number of samples increases to infinity, the MLE is asymptotically unbiased and efficient, i.e., to achieve the Cramer-Rao lower bound.

The cardinality of distributed streams can be estimated using vectors that are compact representations of the actual elements in the streams of the streams. The vectors have M components, where M>1. Such vectors may also be referred to as "sketches," "statistical sketches," "statistical digests," "digests," or "minimal statistics." Such vectors can be, e.g., sampling-based or hash-based probabilistic vectors. These probabilistic vector-based solutions, which largely focus on deriving novel algorithms for deriving the vectors, include the Flajolet-Martin (FM) estimator, proposed for calculating the cardinality of a single stream, as disclosed in Flajolet et al., "Probabilistic counting," *In Proc. Symp. on Foundations of Computer Science (FOCS),* 1983, which is incorporated herein by reference in its entirety.

A continuous variant of the Flajolet-Martin (FM) vector, which is used to develop an efficient PUE estimator for stream-expression cardinalities, will now be described. Flajolet and Martin proposed an estimator for counting distinct values in a single stream, using a hash-based probabilistic vector with O (log N) space, where N is the true cardinality. In the original version of the Flajolet-Martin (FM) algorithm for generating vectors, a hash function is used to map an element in the stream to an integer that follows a geometric distribution. In embodiments of the present invention, a continuous variant of the FM algorithm is developed by replacing the geometric random number with a uniform random number. The continuous variant is used to simplify the statistical analysis, as will be discussed below.

To generate independent replicates of statistics used for counting cardinalities, a technique referred to as stochastic averaging is employed, as described in Durand et al., "Loglog counting of large cardinalities," *Proceedings of European Symposium on Algorithms,* pages 605-617, 2003, which is incorporated herein by reference in its entirety. In stochastic averaging, elements are randomly distributed over an array of buckets. For a single stream $\mathcal{T}$, the expression [M] represents the data domain of its element e. In the example of IP-flow counting, e is the packet-flow ID, and [M] is the set of all possible values of flow IDs. As shown in the flowchart of FIG. 5, the continuous FM vector $Y[k], k=1, \ldots, m$, is generated for an array of size m, using the following method. First, at step 510, a hash array $Y[k]$ is initialized with 1 for all k. At step 520, an incoming element e is hashed using the function $h:[M] \to \{1, \ldots, m\}$, which is a universal hash function that maps an element uniformly over an array of m buckets. At step 530, a random number is generated using the function $g:[M] \to [0,1]$, which is a universal hash function that maps the element e to a uniform random number in [0,1], independent of h. For each incoming element e, the variable $k=h(e)$ represents the bucket to which e is mapped. At step 540, an update of $Y[k]$ is then performed using:

$$Y[k] \leftarrow \min(Y[k], g(e)). \qquad (3)$$

At step 550, a determination is made whether additional elements e exist, in which case the method returns to step 520. If, at step 550, it is determined that no additional elements exist, then the method proceeds to step 560, wherein hash array Y is returned as a result. A bucket value will remain at 1 if no element is hashed to that bucket. The following exemplary pseudo-code (Algorithm 1) may be used to implement continuous FM-vector generation for stream $\mathcal{T}$:

---
Algorithm 1: Continuous FM Sketch for a Stream $\mathcal{T}$

1:   Initialize a hash array Y of size m with values 1.
2:   for each incoming element e of $\mathcal{T}$ do
3:     Hash e into a bucket $k = h(e)$ uniformly, where $k \in \{1,2,\ldots,m\}$
4:     Generate a random number g(e) uniformly on the interval [0,1].
5:     Update $Y[k]$ by $\min(Y[k], g(e))$.
6:   Return Y at the end of the stream.

---

In Algorithm 1, steps 1, 2, 3, 4, 5, and 6 correspond to steps 510, 550, 520, 530, 540, and 560 of FIG. 5, respectively, as described above. The variable $\mu = m^{-1}|\mathcal{T}|$ represents the mean number of distinct elements in each bucket for $\mathcal{T}$.

By ignoring the weak dependence among $\{Y[k], 1 \leq k \leq m\}$, the likelihood function of $\mu$ can be written as $$L(\mu) = e^{-\mu \sum_{k=1}^{m} I(Y[k]=1)} \prod_{Y[k]<1} \mu e^{-\mu Y[k]},$$

where $I(\cdot)$ is an indicator function. Thus, the MLE of $\mu$, and hence $|\mathcal{T}|$, are given by:

$$\hat{\mu} = \frac{\sum_{k=1}^{m} I(Y[k]<1)}{\sum_{k=1}^{m} Y[k]}, \quad |\mathcal{T}| = m\hat{\mu}. \qquad (4)$$

It is assumed above that two universal hash functions h and g are available for producing random independent numbers. To be more realistic, t-wise independent hashing, which employs additional storage for storing a seed, could alternatively be used.

The development of a new, Proportional-Union Estimation (PUE) method for estimating the cardinality of a stream expression using continuous FM vectors will now be described. To facilitate the clarity of the following description, a PUE method will first be demonstrated for a set expression over two streams $\mathcal{T}_1, \mathcal{T}_2$, and then this method will be generalized to an arbitrary number of streams $\mathcal{T}_j, j=1, \ldots, J$.

Figure 3:
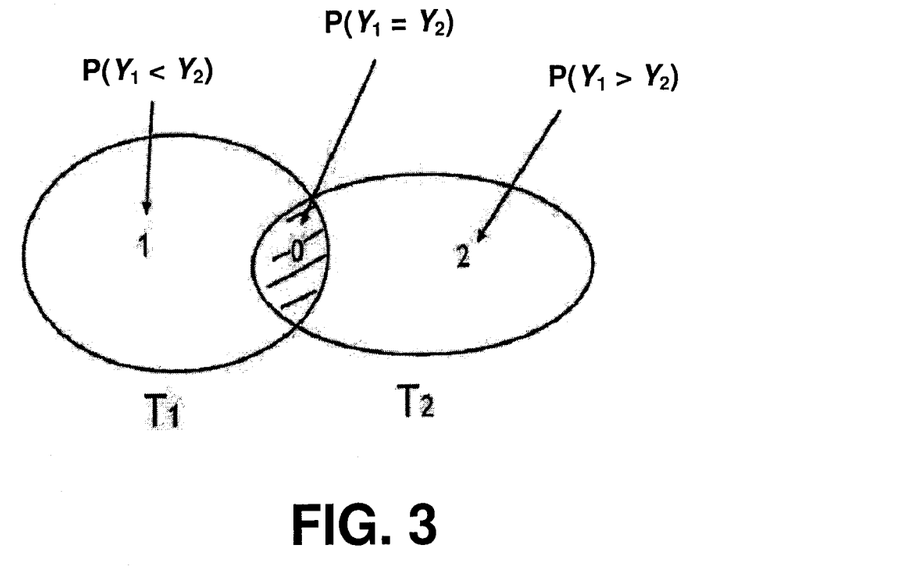
FIG. 3 is a Venn diagram illustrating proportions of set-expression cardinalities for a two-stream set expression.

For each stream $\mathcal{T}_j, j=1, 2$, the expression $Y_j[k]$, $1 \leq k \leq m$ represents the corresponding continuous FM vector, obtained using Algorithm 1 with the same hash functions h and g. (For ease of reference, the "[k]" portion of the expression will be omitted when referring to these vectors at a bucket location k.) As shown in FIG. 3, the stream union $\mathcal{T}_1 \cup \mathcal{T}_2$ can be partitioned into three subsets, $\mathcal{T}_1 \cap \mathcal{T}_2$, $\mathcal{T}_1 \setminus \mathcal{T}_2$, and $\mathcal{T}_2 \setminus \mathcal{T}_1$.

The following Statement 1 enables a proportional-union estimate for all three cardinalities, $|\mathcal{T}_1 \cap \mathcal{T}_2|$, $\mathcal{T}_1 \setminus \mathcal{T}_2$, and $\mathcal{T}_2 \setminus \mathcal{T}_1$:

Statement 1:
Suppose that m is large enough such that
$(1-m^{-1})^m \approx e^{-1}$, Let $N = |\mathcal{T}_1 \cup \mathcal{T}_2|$, and $\epsilon = \exp(-N/m)$.
Then $$P(Y_1 = Y_2) \approx (1-\epsilon) N^{-1} |\mathcal{T}_1 \cap \mathcal{T}_2|,$$

$$P(Y_1 < Y_2) \approx (1-\epsilon) N^{-1} |T_1 \setminus T_2|,$$

$$P(Y_1 > Y_2) \approx (1-\epsilon) N^{-1} |T_2 \setminus T_1|.$$

For example, if N is large enough such that $\epsilon$ is negligible, then Statement 1 permits the conclusion that $|\mathcal{T}_1 \cap \mathcal{T}_2| \approx NP(Y_1=Y_2)$. Therefore, an estimate of $\mathcal{T}_1 \cap \mathcal{T}_2$ can be obtained using the product of estimates of $|\mathcal{T}_1 \cup T_2|$ and $P(Y_1=Y_2)$. It is noted that the continuous FM vector (Algorithm 1) of the stream union $\mathcal{T}_1 \cup \mathcal{T}_2$ is exactly the bucket-wise minimum $\min(Y_1, Y_2)$, and therefore, $|\mathcal{T}_1 \cup \mathcal{T}_2|$ can be estimated by using Equation (4) on the new vector. Furthermore, $P(Y_1=Y_2)$ can be estimated empirically from the observed vector-pair $(Y_1, Y_2)$.

If $\hat{N}$ is the estimate of N by using Equation (4) on the continuous FM vector of the stream union $\mathcal{T}_1 \cup \mathcal{T}_2$, defined by $\min(Y_1, Y_2)$, then, for a large N such that $\epsilon$ is negligible, the cardinalities $\mathcal{T}_1 \cup \mathcal{T}_2$, $|\mathcal{T}_1 \setminus \mathcal{T}_2|$, and $|\mathcal{T}_2 \setminus \mathcal{T}_1|$ can be estimated by $$|\mathcal{T}_1 \cap \mathcal{T}_2|^{(PU)} = \hat{N} \cdot \hat{P}(Y_1 = Y_2)$$

$$|\mathcal{T}_1 \setminus \mathcal{T}_2|^{(PU)} = \hat{N} \cdot \hat{P}(Y_1 < Y_2)$$

$$|\mathcal{T}_2 \setminus \mathcal{T}_1|^{(PU)} = \hat{N} \cdot \hat{P}(Y_2 < Y_1),$$

(6)

respectively, where $\hat{P}$ represents the empirical probabilities based on the observed vector pair $(Y_1[k], Y_2[k])$, $k=1, \ldots, m$. In other words, the first line of Equation (6) states that an estimate for $\mathcal{T}_1 \cap \mathcal{T}_2$ can be derived by multiplying the estimate $\hat{N}$ of stream union N by the estimated probability that $Y_1=Y_2$. The second line of Equation (6) states that an estimate for $|\mathcal{T}_1 \setminus \mathcal{T}_2|$ can be derived by multiplying the estimate $\hat{N}$ of stream union N by the estimated probability that $Y_1<Y_2$. The third line of Equation (6) states that an estimate for $|\mathcal{T}_2 \setminus \mathcal{T}_1|$ can be derived by multiplying the estimate $\hat{N}$ of stream union N by the estimated probability that $Y_2<Y_1$. Equation (6) can be used to obtain an estimate of either (i) the number of received data packets that have been received by all of the nodes of the set, or (ii) the number of flows within received data packets that have passed through all of the nodes of the set. The foregoing estimation scheme or method is referred to as a Proportional-Union Estimator (PUE) because the estimation is based on proportions of subsets of a stream union.

If $\epsilon = \exp(-N/m)$ is not negligible, then Equation (5) can be inverted to obtain a PUE estimate of the cardinalities.

A PUE method will now be generalized to estimate the cardinality of a set expression over multiple streams $\mathcal{T}_j$, $j=1, \ldots, J$, with $J \geq 2$. The expression $Y_j[k]$, $k=1, \ldots, m$ represents the corresponding continuous FM vectors by Algorithm 1 for stream $\mathcal{T}_j$. As before, for ease of reference, the "[k]" portion of the expression will be omitted when referring to these vectors at a bucket location k. The expression $Y_\cap$ represents the continuous FM vector for the stream union $\cup_{j=1}^J \mathcal{T}_j$ and is defined as:

$$Y_\cup = \min(Y_1, \ldots, Y_J). \quad (7)$$

The following Statement 2 is an extension of Statement 1 on $P(Y_1=Y_2)$ to the case of multiple streams:

Statement 2:
Suppose m is large enough such that $(1-m^{-1})^m \approx e^{-1}$.
Let $N = |\cup_{j=1}^J \mathcal{T}_j|$, and $e = \exp(-N/m)$.
Then for $1 \leq d \leq J$, $$P(Y_1 = Y_2 = \ldots = Y_d = Y_\cap) \approx e + (1-e) N^{-1} |\cap_{j=1}^d \mathcal{T}_d|. \quad (8)$$

Figure 4:
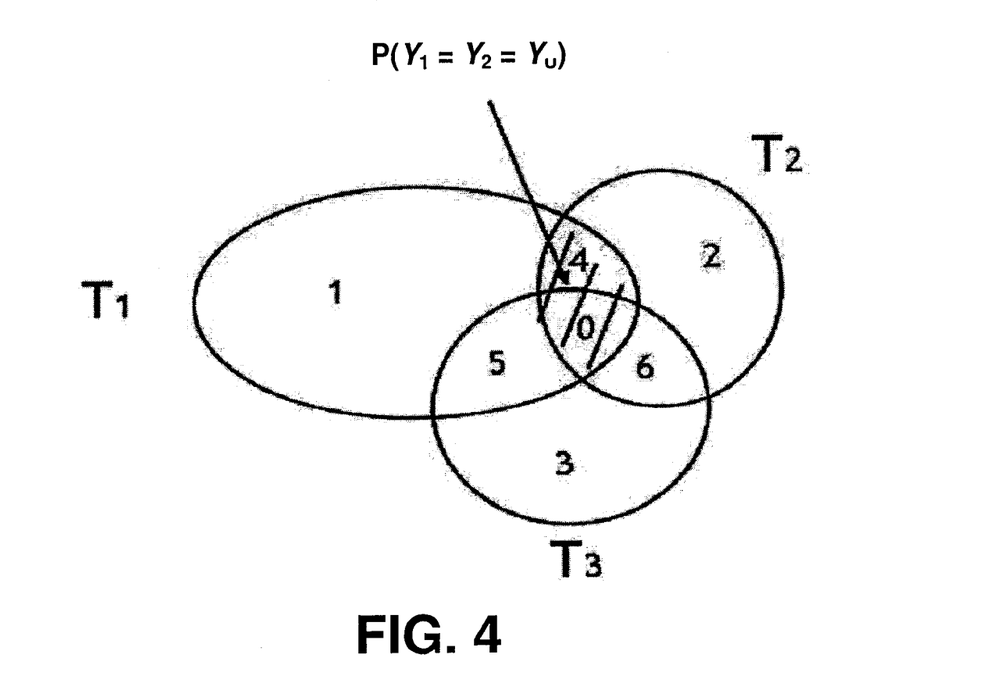
FIG. 4 is a Venn diagram illustrating proportions of set-expression cardinalities for a three-stream set expression.

FIG. 4 illustrates an example of set expressions over J=3 streams $\mathcal{T}_1, \mathcal{T}_2, \mathcal{T}_3$, where d=2. It is noted that the stream union can be partitioned into 7 exclusive subsets, numbered from 0 to 6. For example, subset 0 denotes $\cap_{j=1}^3 \mathcal{T}_j$. It should be understood that a generalization can be made to arbitrary values of J and d.

Supposing that S is a set expression over J streams, whose cardinality is the subject of interest, to complete the generalization of a PUE method for $|S|$, two additional techniques are used for dealing with set expressions, which is illustrated by the following example. Considering $S = \mathcal{T}_1 \setminus ((\mathcal{T}_2 \cap \mathcal{T}_1, \mathcal{T}_2, \mathcal{T}_3,) \cup \mathcal{T}_4)$, the first technique is to remove set differences that appear in the expression using the relation $$\mathcal{A} \setminus \mathcal{B} = |\mathcal{A}| - |\mathcal{A} \cap \mathcal{B}|.$$

It is noted that this relation can be used repeatedly if there are multiple set differences. In this example, this implies $$|\mathcal{T}_1 \setminus ((\mathcal{T}_2 \cap \mathcal{T}_1, \mathcal{T}_2, \mathcal{T}_3,) \cup \mathcal{T}_4)| = |\mathcal{T}_1| - |(\mathcal{T}_1 \cap ((\mathcal{T}_2 \cap \mathcal{T}_1, \mathcal{T}_2, \mathcal{T}_3,) \cup \mathcal{T}_4))|.$$

Without loss of generality, it can be assumed that the set expression only involves unions and intersections. The second technique is to rewrite the set expression in terms of intersections of set unions, i.e., $$(\mathcal{A} \cap \mathcal{B}) \cup \mathcal{C} = (\mathcal{A} \cup \mathcal{C}) \cap (\mathcal{B} \cup \mathcal{C}).$$

In this example, this implies $$\mathcal{T}_1 \cap ((\mathcal{T}_2 \cap \mathcal{T}_1, \mathcal{T}_2, \mathcal{T}_3,) \cup \mathcal{T}_4) = \mathcal{T}_1 \cap (\mathcal{T}_2 \cup \mathcal{T}_4) \cap (\mathcal{T}_1, \mathcal{T}_2, \mathcal{T}_3, \cup \mathcal{T}_4).$$

It is noted that the continuous FM vector of a set union of d streams is exactly the minimum of the d individual FM vectors. If $p_S = |S|/N$ is the proportion of $|S|$ in the total union, then, by applying Statement 2 with vectors $Y_j$ replaced by the vectors corresponding to the set unions, a close approximation of $p_s$ can be derived. In this example, the following expressions hold true (for simplicity, $\epsilon$ is assumed to be ignorable):

$$N^{-1} |\mathcal{T}_1| \approx P(Y_1 = Y_\cup),$$

$$N^{-1} |\mathcal{T}_1 \cap ((\mathcal{T}_2 \cap \mathcal{T}_1, \mathcal{T}_2, \mathcal{T}_3,) \cup \mathcal{T}_4)| \approx P(Y_1 = \min(Y_2, Y_4) = \min(Y_3, Y_4) = Y_\cup),$$

and thus $$p_S = N^{-1} |\mathcal{T}_1 \setminus ((\mathcal{T}_2 \cap \mathcal{T}_1, \mathcal{T}_2, \mathcal{T}_3,) \cup \mathcal{T}_4)| \approx (P(Y_1=Y_\cup)-P(Y_1=\min(Y_2,Y_4)=\min(Y_3,Y_4)=Y_\cup)).$$

Assuming $\hat{N}$ is the estimate of N by $Y_\cup$, and $\hat{p}_S$ is the empirical proportion based on the observed vector corresponding to the tuple of the J streams, if N is large enough such that $\epsilon = \exp(-N/m)$ is negligible, then a PUE estimate of $|S|$ can be obtained in a straightforward way as in the two-stream case, by:

$$\widehat{|S|}^{(PU)} = \hat{N} \cdot \hat{p}_S.$$

It is noted that $\epsilon$ can be estimated by $e^{-\hat{N}/m}$. If $\epsilon$ is not negligible, then the proportion equation derived from the above procedure can be inverted to obtain the PUE estimate of $|S|$ correspondingly.

The relative standard error (RSE) for PUE grows linearly with $p_S^{-1}$, and the RSE of the proportional-union estimator for a set expression S is:

$$E\left(\frac{|\hat{S}|^{(PU)}}{|S|} - 1\right)^2 \approx \frac{1}{mp_S}.$$

The memory usage of a PUE scheme will now be discussed. For the stream expression S, the variable $\delta$ represents a specified value of the relative standard error of a proportional-union estimate of $|S|$. Given the above equation for calculating RSE, the number of buckets used for a given S is $$m \approx \delta^{-2} p_S^{-1}.$$

If the expression E is a unit-exponential random variable, and $\lambda_j = |\mathcal{T}_j|/m$, $j=1, \ldots, J$, then the continuous FM vector $Y_j$ for $\mathcal{T}_j$ is a right-censored exponential, defined by $$Y_j = \min(\lambda_j^{-1} E, 1) \quad (9)$$

Since $\lambda_j \sim O(N)$, it is implied that $Y_j$ uses $O(\log N)$ storage bits. The following procedure can reduce the per-bucket storage of vector statistics $Y_j$ from $\log N$ to $\log \log N$, by instead storing $\log Y_j$. It is noted that, by Equation (9), $$\log Y_j = \min(0, -\log(\lambda_j) + \log E). \quad (10)$$

Assuming $\log \log \lambda_j$ is an integer, $\log \lambda_j$ uses $\log \log \lambda_j$ storage bits, and $\log Y$ uses at most $\log \log(N)+a$ storage bits, where the a bits are used for storing the decimals of $\log E$ (for reference, it is noted that the 0.1% and 99.9% quantiles of $\log E$ are $-6.907$ and $1.933$, respectively). Therefore, the per-bucket storage is now at most $O(\log \log N)$, and the total memory used is $\delta^{-2} p_S^{-1} (\log \log N+a)$.

From experimental studies, it has been observed that $a=10$ bits is enough for storing the decimals of $\log E$ without compromising the overall accuracy of the cardinality estimate. This can be further justified using a careful bias analysis of the probability approximation of $p_s$, e.g., using Equations (5) and (8). For example, considering $S = \mathcal{T}_1 \cap \mathcal{T}_2$ over the J streams, and $p = p_S = P(Y_1=Y_2=Y_\cup)$, where $p^{(l)}$ is the new probability based on the discretized vectors $Y_j$, $j=1, \ldots, J$, described above, it can be shown that $p \leq p^{(l)} \leq p + 2^{-a+1}$. Therefore, if $a=10$, then the difference in the probabilities is at most 0.002, which is negligible for practical purposes.

It is further noted that, alternatively, a direct method can be used for computing the logarithmic vector $\log Y_j$. By Algorithm 1, the following expression is true:

$$Y_j = \min(1, U_1, \ldots, U_B),$$

where B is a binomial random number representing the number of distinct elements that are mapped to the bucket, and each $U_i$ is a uniform random number in $[0,1]$. It is noted that $-\log U_i$ follows a unit exponential distribution, and therefore, $$\log Y_j = -\max(0, -\log U_1, \ldots, -\log U_B).$$

Thus, to generate the logarithmic continuous FM vectors, the uniform random number generator $g(\bullet)$ can be replaced by a unit-exponential random-number generator (with the decimal truncated into a bits), and the minimum update can be replaced by a maximum update. This avoids taking the logarithm in the vector generation, and the initial values for the buckets now become 0 instead of 1.

The efficiency of a PUE method will now be discussed, using the formal statistical methods described above. The likelihood of the continuous FM vectors is derived for the case of two streams, the MLE of the cardinality parameters is obtained, and then its asymptotic variance is compared with that of a PUE method. As explained above, MLE is asymptotically most efficient, because it can achieve the Cramer-Rao lower bound. For a set expression $S$ whose cardinality is the subject of interest, $p = |S|/N$ is the proportion of the cardinality of $S$ in the total union. It will be shown that, in the two-stream case, a PUE method is as efficient as that of MLE when $p$ is small.

In addition to the notation used above in the discussion of set expressions over two streams, the following are defined as unknown cardinality parameters:

$$\lambda_0 = |\mathcal{T}_1 \cap \mathcal{T}_2|/m, \lambda_1 = |\mathcal{T}_1 \setminus \mathcal{T}_2|/m, \lambda_2 = |\mathcal{T}_2 \setminus \mathcal{T}_1|/m,$$

where $$\theta = (\lambda_0, \lambda_1, \lambda_2)^T.$$

The function $f_\lambda(\bullet)$ denotes the density function of an exponential random variable with rate $\lambda$, i.e., $f_\lambda(x) = \lambda e^{-\lambda x}$, $x \geq 0$. The density function for the continuous FM vectors $(Y_1, Y_2)$, i.e., $P(Y_1=y_1, Y_2=y_2)$, $0 \leq y_1, y_2 \leq 1$, can be expressed as $$\begin{cases} e^{-(\lambda_0+\lambda_1+\lambda_2)}, & y_1=y_2=1 \text{ (case 1)} \\ e^{-(\lambda_0+\lambda_2)} f_{\lambda_1}(y_1), & y_1 < y_2 = 1 \text{ (case 2)} \\ e^{-(\lambda_0+\lambda_1)} f_{\lambda_2}(y_2), & y_2 < y_1 = 1 \text{ (case 3)} \\ \lambda_0 e^{-(\lambda_0+\lambda_1+\lambda_2)y_1}, & y_1 = y_2 < 1 \text{ (case 4)} \\ f_{\lambda_2}(y_2) f_{\lambda+\lambda_2}(y_1), & y_2 < y_1 < 1 \text{ (case 5)} \\ f_{\lambda_1}(y_1) f_{\lambda+\lambda_2}(y_2), & y_1 < y_2 < 1 \text{ (case 6)} \end{cases} \quad (11)$$

The vectors at two different bucket locations $(Y_1[k], Y_2[k])$ and $(Y_1[j], Y_2[j])$ for $j \neq k$, are very weakly dependent. If $l(\theta)$ is the negative logarithmic-likelihood function of the continuous FM vectors $(Y_1[k], Y_2[k])$, $k=1, \ldots, m$, i.e., $$l(\theta) = -\sum_{k=1}^{m} \log\{P(Y_1[k], Y_2[k])\},$$

then the following Result 1 provides the gradient and Hessian matrix of $l(\theta)$ with respect to $\theta$, noting that the expectation of the Hessian matrix is the same as the information matrix $I(\theta)$ defined in Equation (1).

Result 1:
The gradient $$g = \frac{\partial l(\theta)}{\partial \theta}$$

is given by $$\begin{bmatrix} \frac{m_6}{\lambda_0 + \lambda_2} + \frac{m_5}{\lambda_0 + \lambda_1} + \frac{m_4}{\lambda_0} - S_3 \\ \frac{m_2 + m_6}{\lambda_1} + \frac{m_5}{\lambda_0 + \lambda_1} - S_1 \\ \frac{m_3 + m_5}{\lambda_2} + \frac{m_6}{\lambda_0 + \lambda_2} - S_2 \end{bmatrix} \quad (12)$$

where $m_i$ are the number of buckets of case i defined in Equation 13, $$S_1 = \sum_{k=1}^{m} Y_1[k],$$

$$S_2 = \sum_{k=1}^{m} Y_2[k], \text{ and}$$

$$S_3 = \sum_{i=1}^{m} \max(Y_1[k], Y_2[k]).$$

Equation 13

The Hessian matrix $$\mathcal{H} = \frac{\partial^2 l(\theta)}{\partial \theta \partial \theta^T}$$

is a 3×3 symmetric non-negative definite matrix with elements $H_{ij}$ given by:

$$\begin{cases} \mathcal{H}_{11} = \frac{m_6}{(\lambda_0 + \lambda_2)^2} + \frac{m_5}{(\lambda_0 + \lambda_1)^2} + \frac{m_4}{\lambda_0^2}, \\ \mathcal{H}_{12} = \mathcal{H}_{21} = \frac{m_5}{(\lambda_0 + \lambda_1)^2}; \\ \mathcal{H}_{13} = \mathcal{H}_{31} = \frac{m_6}{(\lambda_0 + \lambda_2)^2} \\ \mathcal{H}_{22} = \frac{m_2 + m_6}{\lambda_1^2} + \frac{m_5}{(\lambda_0 + \lambda_1)^2}; \\ \mathcal{H}_{23} = \mathcal{H}_{32} = 0; \\ \mathcal{H}_{33} = \frac{m_3 + m_5}{\lambda_2^2} + \frac{m_6}{(\lambda_0 + \lambda_2)^2}. \end{cases} \quad (13)$$

Furthermore if $m_5 > 0$ and $m_6 > 0$, $\mathcal{H}$ is strictly positive definite and thus $l(\theta)$ is a strictly convex function. If $|\mathcal{T}_1 \cap \mathcal{T}_2| > 0$, then the probability $$P(m_5 > 0, m_6 > 0) \approx 1 - \sum_{j=1}^{2} \left(\frac{|\mathcal{T}_j|}{N}\right)^m + \left(\frac{|\mathcal{T}_1 \cap \mathcal{T}_2|}{N}\right)^m$$

is almost 1 for large m.

Unlike a PUE estimate, the MLE of θ that minimizes $l(\theta)$ does not have a closed-form solution. By Result 1, $l(\theta)$ is strictly convex with a probability of almost 1, and hence, its unique minimum can be located using a Newton-Rapson algorithm, e.g., wherein the expression $\hat{\theta}^{(MLE)}$ represents the MLE of θ by minimizing $l(\theta)$, and the MLE of cardinalities is simply $$(|\widehat{\mathcal{T}_1 \cap \mathcal{T}_2}|^{(MLE)}, |\widehat{\mathcal{T}_1 \setminus \mathcal{T}_2}|^{(MLE)}, |\widehat{\mathcal{T}_2 \setminus \mathcal{T}_1}|^{(MLE)}) = m\hat{\theta}^{(MLE)}. \quad (14)$$

It has been observed, through simulation and experimental studies, that the Newton-Rapson iteration typically employs only a few steps (less than 5) before convergence is reached. The following Statement 3 provides the asymptotic distribution for the relative accuracy of $\hat{\theta}^{(MLE)}$:

Statement 3:
Let $p_s = |\mathcal{S}|/N$. For $\lambda_0 > 0$ and large $\lambda_0 + \lambda_i$, i=1, 2, as m goes to infinity, we have for $\mathcal{S} = \mathcal{T}_1 \cap \mathcal{T}_2$, $\mathcal{T}_1 - \mathcal{T}_2$ and $\mathcal{T}_2 - \mathcal{T}_1$, $$\sqrt{m}\left(\frac{|\hat{\mathcal{S}}|^{(MLE)}}{|\mathcal{S}|} - 1\right) \to \text{Normal}\left(0, \frac{1}{p_S(1+b)}\right),$$

where b is a small number given in Equation 19 in the appendix.

Comparing the relative standard error of the MLE estimator and that of a PUE estimator, the efficiency of PUE as compared to MLE, defined by the ratio of their MSEs, i.e., Equation (2), is:

$$\text{eff}\left(|\hat{\mathcal{S}}|^{(PU)}\right) = \frac{1}{1+b},$$

which is close to 1 for a small value of $p_s$. Therefore, a PUE estimator has almost the same efficiency as the MLE estimator.

For cardinalities defined over a larger number of streams, a PUE method is still relatively simple to implement, while the MLE method becomes difficult, due to the complexity of the likelihood computation.

Figure 6:
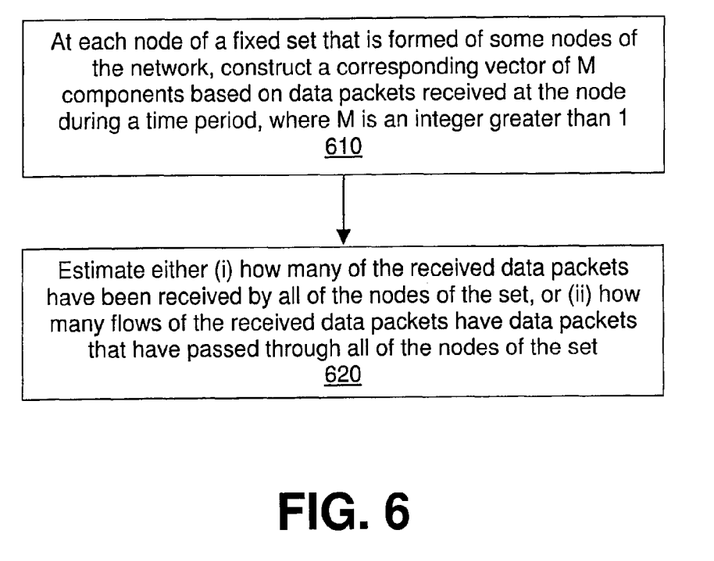
FIG. 6 is a flowchart illustrating an exemplary method consistent with one embodiment of the present invention.

FIG. 6 is a flowchart illustrating an exemplary method consistent with one embodiment of the present invention. At step 610, at each node of a fixed set that is formed of some nodes of the network, a corresponding vector of M components is constructed based on data packets received at the node during a time period, where M is an integer greater than 1. Next, at step 620, based on the constructed vectors, an estimate is made of either (a) how many of the received data packets have been received by all of the nodes of the set, or (b) how many flows of the received data packets have data packets that have passed through all of the nodes of the set. Step 620 includes updating a component of the vector of one of the nodes in response to the one of the nodes receiving a data packet. The updating includes selecting the component for updating by hashing a property of the data packet received by the one of the nodes.

The estimating may estimate how many of the data packets have propagated to every node of the set. The estimating may estimate how many of the flows have data packets that have passed through all of the nodes of the set. The updating may further include determining a number to assign to the component for updating based on the property of the data packet received by the one of the nodes. The estimating may involve evaluating a correlation between the vectors.

The constructing of the vector of M components may involve updating the number assigned to each component of one of the vectors by a process that changes the assigned number in a monotonic manner.

Figure 7:
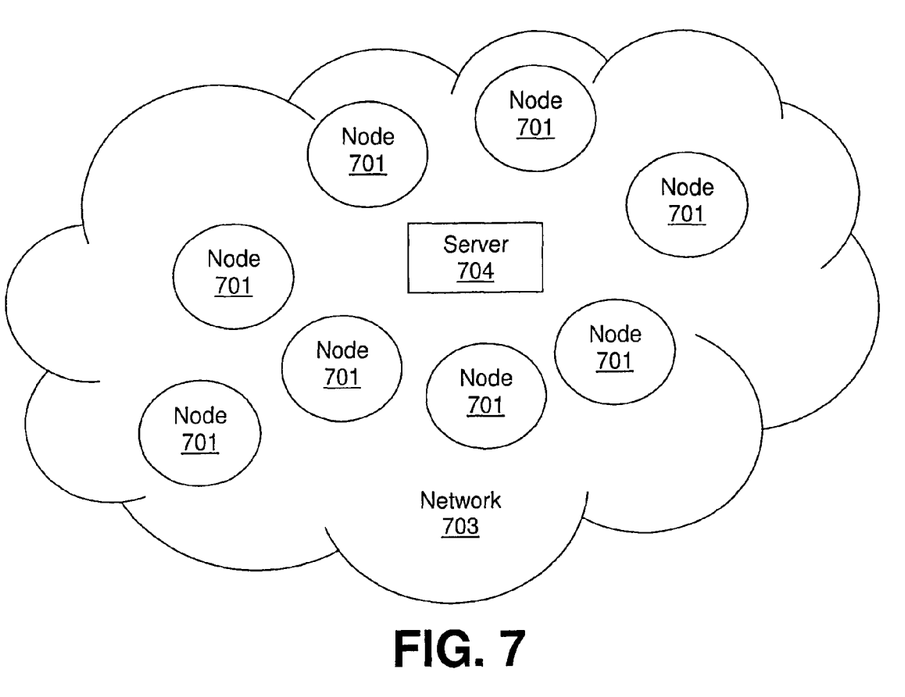
FIG. 7 is an exemplary block diagram of a network implementing an exemplary method consistent with one embodiment of the present invention.

FIG. 7 is an exemplary block diagram of a network 703 implementing an exemplary method consistent with one embodiment of the present invention. As shown, network 703 includes a fixed set formed of some nodes 701 of the network and a server 704. Each node 701 is configured to construct a corresponding vector of M components based on data packets received at the node during a time period, M being an integer greater than 1. Server 704 is configured to (i) receive the constructed vectors from nodes 701 and (ii) based on the constructed vectors, estimate either (a) how many of the received data packets have been received by all of the nodes of the set or (b) how many flows of the received data packets have data packets that have passed through all of the nodes of the set. The constructing of the vector of M components includes updating a component of the vector of one of the nodes in response to the one of the nodes receiving a data packet. The updating includes selecting the component for updating by hashing a property of the data packet received by the one of the nodes.

The estimation performed by the server may estimate how many of the data packets have propagated to every node of the set. The estimation performed by the server may estimate how many of the flows have data packets that have passed through all of the nodes of the set. The updating may further include determining a number to assign to the component for updating based on the property of the data packet received by the one of the nodes. The estimating may involve evaluating a correlation between the vectors.

The constructing of the vector of M components may involve updating the number assigned to each component of one of the vectors by a process that changes the assigned number in a monotonic manner.

The terms "Proportional-Union Estimation" and "PUE" should be understood to include the methods described herein, as well as other implementations and embodiments of proportional-union estimation not specifically set forth herein, and that such terms should not be construed as being limited by the methods described herein.

While embodiments of the invention disclosed herein use an FM method for generating vectors, it should be understood that a PUE estimator consistent with alternative embodiments of the invention could use other methods for generating vectors.

The present invention has applicability in monitoring traffic in different environments and comprising data streams of different types, including not only traditional-network (e.g., hardwired LAN) data streams, but also, e.g., wireless-network data streams, sensor-network data streams, and financial-application data streams.

The term "random," as used herein, should not be construed as being limited to pure random selections or number generations, but should be understood to include pseudo-random, including seed-based selections or number generations, as well as other selection or number generation methods that might simulate randomness but are not actually random, or do not even attempt to simulate randomness.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of data-storage media, such as magnetic recording media, optical recording media, solid state memory, floppy diskettes, CD-ROMs, hard drives, or any other machine-readable data-storage medium storing machine-readable program code, wherein the program code includes a set of instructions for executing one of the inventive methods on a digital data-processing machine, such as a computer, to perform the method. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A computer-implemented method of monitoring a network, comprising:
   at each node of a fixed set, the computer constructing a corresponding vector of M components based on data packets received at the node during a time period, M being an integer greater than 1, the fixed set being formed of some nodes of the network; and based on the constructed vectors, the computer estimating at least one of: (a) how many of the received data packets have been received by all of the nodes of the set and (b) how many flows of the received data packets have data packets that have passed through all of the nodes of the set;

wherein:

the constructing includes updating a component of the vector of one of the nodes in response to the one of the nodes receiving a data packet, the updating including selecting the component for updating by hashing a property of the data packet received by the one of the nodes; and the hashing includes (i) mapping the property of the received data packet to a first element of a first hash function having a set of first elements and (ii) mapping the property of the received data packet to a second element of a second hash function having a set of second elements, wherein the property of the received data packet is a hash key used for both the first hash function and the second hash function.

2. The method of claim 1, wherein the estimating estimates how many of the data packets have propagated to every node of the set.

3. The method of claim 1, wherein the estimating estimates how many of the flows have data packets that have passed through all of the nodes of the set.

4. The method of claim 1, wherein the updating further comprises determining a number to assign to the component for updating based on the property of the data packet received by the one of the nodes.

5. The method of claim 4, wherein the constructing involves updating the number assigned to each component of one of the vectors by a process that changes the assigned number in a monotonic manner.

6. The method of claim 1, wherein the estimating involves evaluating a correlation between the vectors.

7. The method of claim 1, wherein each vector is generated using an algorithm employing a first hash function and a second hash function independent of the first hash function.

8. The method of claim 7, wherein:

the first hash function maps an element of each data stream to a bucket of a hash array;

the second hash function maps the element of each data stream to a random number; and for at least one component of a vector, the value of the bucket mapped in the first hash function is updated based on the random number mapped in the second hash function.

9. The method of claim 1, wherein:

the computer estimates (a) how many of the received data packets have been received by all of the nodes of the set, and the computer does not estimate (b) how many flows of the received data packets have data packets that have passed through all of the nodes of the set.

10. The method of claim 1, wherein:

the computer estimates (b) how many flows of the received data packets have data packets that have passed through all of the nodes of the set, and the computer does not estimate (a) how many of the received data packets have been received by all of the nodes of the set.

11. A network comprising:

a fixed set of nodes, each node configured to construct a corresponding vector of M components based on data packets received at the node during a time period, M being an integer greater than 1, the fixed set being formed of some nodes of the network; and a server configured to (i) receive the constructed vectors from the nodes and (ii) based on the constructed vectors, estimate at least one of: (a) how many of the received data packets have been received by all of the nodes of the set and (b) how many flows of the received data packets have data packets that have passed through all of the nodes of the set;

wherein:

the constructing of the vector of M components includes updating a component of the vector of one of the nodes in response to the one of the nodes receiving a data packet, the updating including selecting the component for updating by hashing a property of the data packet received by the one of the nodes; and the hashing includes (i) mapping the property of the received data packet to a first element of a first hash function having a set of first elements and (ii) mapping the property of the received data packet to a second element of a second hash function having a set of second elements, wherein the property of the received data packet is a hash key used for both the first hash function and the second hash function.

12. The network of claim 11, wherein the estimation performed by the server estimates how many of the data packets have propagated to every node of the set.

13. The network of claim 11, wherein the estimation performed by the server estimates how many of the flows have data packets that have passed through all of the nodes of the set.

14. The network of claim 11, wherein the updating further comprises determining a number to assign to the component for updating based on the property of the data packet received by the one of the nodes.

15. The network of claim 14, wherein the constructing of the vector of M components involves updating the number assigned to each component of one of the vectors by a process that changes the assigned number in a monotonic manner.

16. The network of claim 11, wherein the estimating involves evaluating a correlation between the vectors.

17. The network of claim 11, wherein each vector is generated using an algorithm employing a first hash function and a second hash function independent of the first hash function.

18. The network of claim 17, wherein:

the first hash function maps an element of each data stream to a bucket of a hash array;

the second hash function maps the element of each data stream to a random number; and for at least one component of a vector, the value of the bucket mapped in the first hash function is updated based on the random number mapped in the second hash function.

19. The network of claim 11, wherein:

the server is configured to estimate (a) how many of the received data packets have been received by all of the nodes of the set, and the server is not configured to estimate (b) how many flows of the received data packets have data packets that have passed through all of the nodes of the set.

20. The network of claim 11, wherein:

the server is configured to estimate (b) how many flows of the received data packets have data packets that have passed through all of the nodes of the set, and the server is not configured to estimate (a) how many of the received data packets have been received by all of the nodes of the set.

21. A non-transitory computer-readable storage medium having stored thereon a plurality of instructions, the plurality of instructions including instructions which, when executed by a processor, cause the processor to implement a method of monitoring a network, the method comprising:
- at each node of a fixed set, constructing a corresponding vector of M components based on data packets received at the node during a time period, M being an integer greater than 1, the fixed set being formed of some nodes of the network; and
- based on the constructed vectors, estimating at least one of: (a) how many of the received data packets have been received by all of the nodes of the set and (b) how many flows of the received data packets have data packets that have passed through all of the nodes of the set;

wherein:
- the constructing includes updating a component of the vector of one of the nodes in response to the one of the nodes receiving a data packet, the updating including selecting the component for updating by hashing a property of the data packet received by the one of the nodes; and
- the hashing includes (i) mapping the property of the received data packet to a first element of a first hash function having a set of first elements and (ii) mapping the property of the received data packet to a second element of a second hash function having a set of second elements, wherein the property of the received data packet is a hash key used for both the first hash function and the second hash function.

22. The non-transitory computer-readable storage medium of claim 9, wherein the estimating estimates how many of the data packets have propagated to every node of the set.

23. The non-transitory computer-readable storage medium of claim 9, wherein the estimating estimates how many of the flows have data packets that have passed through all of the nodes of the set.

24. The non-transitory computer-readable storage medium of claim 21, wherein the updating further comprises determining a number to assign to the component for updating based on the property of the data packet received by the one of the nodes.

25. The non-transitory computer-readable storage medium of claim 24, wherein the constructing involves updating the number assigned to each component of one of the vectors by a process that changes the assigned number in a monotonic manner.

26. The non-transitory computer-readable storage medium of claim 21, wherein the estimating involves evaluating a correlation between the vectors.

27. The non-transitory computer-readable storage medium of claim 21, wherein each vector is generated using an algorithm employing a first hash function and a second hash function independent of the first hash function.

28. The non-transitory computer-readable storage medium of claim 27, wherein:
- the first hash function maps an element of each data stream to a bucket of a hash array;
- the second hash function maps the element of each data stream to a random number; and
- for at least one component of a vector, the value of the bucket mapped in the first hash function is updated based on the random number mapped in the second hash function.

29. The non-transitory computer-readable storage medium of claim 21, wherein:
- the step of estimating comprises estimating (a) how many of the received data packets have been received by all of the nodes of the set, and
- the step of estimating does not comprise estimating (b) how many flows of the received data packets have data packets that have passed through all of the nodes of the set.

30. The non-transitory computer-readable storage medium of claim 21, wherein:
- the step of estimating comprises estimating (b) how many flows of the received data packets have data packets that have passed through all of the nodes of the set, and
- the step of estimating does not comprise estimating (a) how many of the received data packets have been received by all of the nodes of the set.

* * * * *